US012741187B2

(12) United States Patent
Macaulay et al.

(10) Patent No.: US 12,741,187 B2
(45) **Date of Patent: *Sep. 22, 2026**

(54) GOLF SIMULATOR SYSTEM AND METHOD

(71) Applicant: TMRW SPORTS, INC., Winter Park, FL (US)

(72) Inventors: Andrew Macaulay, Winter Park, FL (US); Scott Armstrong, Winter Park, FL (US); Michael M. McCarley, Winter Park, FL (US)

(73) Assignee: TMRW SPORTS, INC., Winter Park, FL (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/897,366

(22) Filed: Sep. 26, 2024

(65) Prior Publication Data

US 2025/0010161 A1 Jan. 9, 2025

Related U.S. Application Data

(63) Continuation of application No. 18/433,143, filed on Feb. 5, 2024, now Pat. No. 12,102,900, which is a (Continued)

(51) Int. Cl.
*A63B 69/36* (2006.01)
*A63B 71/06* (2006.01)
(Continued)

(52) U.S. Cl.
CPC ...... *A63B 69/3676* (2013.01); *A63B 69/3658* (2013.01); *A63B 69/3691* (2013.01);
(Continued)

(58) Field of Classification Search
CPC . A63B 69/36; A63B 69/3661; A63B 69/3676; A63B 69/3691; A63B 69/3697; A63B 2069/3664
See application file for complete search history.

(56) References Cited

U.S. PATENT DOCUMENTS 3,501,152 A * 3/1970 Witucki ............ A63B 69/3658 73/379.04
4,836,551 A 6/1989 Lasalle
(Continued)

FOREIGN PATENT DOCUMENTS

KR 100647498 B1 11/2006
KR 100912011 B1 8/2009
(Continued)

OTHER PUBLICATIONS

International Preliminary Report on Patentability in International Appln. No. PCT/US2023/072643, mailed on Mar. 6, 2025, 22 pages.
(Continued)

*Primary Examiner* — Joshua T Kennedy
(74) *Attorney, Agent, or Firm* — Fish & Richardson P.C.

(57) ABSTRACT

Methods, systems, and apparatus, including computer programs encoded on computer storage media, for providing a golf simulator comprising a computing system with real-life golf courses stored in memory, a projector, and a screen; projecting a simulation of a real-life golf hole stored in memory on the screen with the computing system to provide a simulated golf hole that simulates the real-life golf hole; and using one or more lights to indicate a location of the ball after a simulation of one or more golf shots.

22 Claims, 9 Drawing Sheets

Related U.S. Application Data continuation of application No. PCT/US2023/072643, filed on Aug. 22, 2023.

(60) Provisional application No. 63/399,840, filed on Aug. 22, 2022.

(51) Int. Cl.
*A63B 24/00* (2006.01)
*G09B 9/00* (2006.01)

(52) U.S. Cl.
CPC .. *A63B 71/0622* (2013.01); *A63B 2024/0034* (2013.01); *A63B 2071/0638* (2013.01); *A63B 2071/0694* (2013.01); *A63B 2220/20* (2013.01); *A63B 2220/806* (2013.01); *G09B 9/00* (2013.01)

(56) References Cited

U.S. PATENT DOCUMENTS

| | | | | |
|---|---|---|---|---|
| 9,984,587 | B2 | 5/2018 | Shultz | |
| 10,486,047 | B2 | 11/2019 | Coffman | |
| 10,596,442 | B2 | 3/2020 | Coffman | |
| 10,596,444 | B2 | 3/2020 | Minkovitch | |
| 10,610,734 | B2 | 4/2020 | Claessen et al. | |
| 10,843,056 | B2 | 11/2020 | Rivas | |
| 11,305,172 | B2 | 4/2022 | Coffman | |
| 12,102,900 | B2 | 10/2024 | Macaulay et al. | |
| 2011/0192096 | A1 | 8/2011 | Koberinski et al. | |
| 2012/0289351 | A1 | 11/2012 | Woo | |
| 2014/0004969 | A1 | 1/2014 | Jang et al. | |
| 2015/0011279 | A1 | 1/2015 | Koo | |
| 2015/0080142 | A1* | 3/2015 | Kline | A63B 37/0075 473/221 |
| 2016/0287967 | A1* | 10/2016 | Baldwin | A63B 69/3623 |
| 2017/0036095 | A1* | 2/2017 | Shultz | G09B 19/0038 |
| 2018/0221746 | A1* | 8/2018 | Joo | G06T 7/248 |
| 2019/0134506 | A1* | 5/2019 | Gupta | G09B 19/0038 |
| 2019/0255407 | A1* | 8/2019 | Rivas | A63F 13/812 |
| 2021/0379445 | A1* | 12/2021 | Korpach | A63B 24/0021 |
| 2022/0105416 | A1* | 4/2022 | Arand | A63B 37/0075 |
| 2024/0058682 | A1 | 2/2024 | Macaulay et al. | |

FOREIGN PATENT DOCUMENTS

| | | | | |
|---|---|---|---|---|
| KR | 100918632 | B1 | 9/2009 | |
| KR | 20120009933 | A | 2/2012 | |
| KR | 101159676 | B1 | 6/2012 | |
| KR | 20150053370 | A | 5/2015 | |
| KR | 20170074042 | A | 6/2017 | |
| KR | 101868584 | B1 | 6/2018 | |
| KR | 20180098924 | A | 9/2018 | |
| KR | 20200046777 | A | 5/2020 | |
| KR | 102772691 | B1 * | 2/2025 | A63B 71/0669 |
| WO | WO 2014171765 | A1 | 10/2014 | |

OTHER PUBLICATIONS

International Search Report and Written Opinion in International Appln. No. PCT/US2023/072643, mailed on Nov. 21, 2023, 28 pages.

* cited by examiner

GOLF SIMULATOR SYSTEM AND METHOD

This application is a continuation of U.S. application Ser. No. 18/433,143 filed Feb. 5, 2024, now allowed), which is a continuation of PCT/US2023/072643, filed Aug. 22, 2023, which claims the benefit of U.S. Provisional Application No. 63/399,840, filed Aug. 22, 2022, the contents of which are incorporated by reference herein.

FIELD

The field of the invention relates generally to a golf simulator system and a method for playing golf partially with a simulator and partially with a real-life adjustable chipping and putting area. The real-life chipping and putting area can be adjusted to mimic the chipping position and/or putting green of a simulated golf hole, so that a player can hit longer shots on a simulated, or partially simulated, golf course and chip and putt on the real-life chipping and putting area. The simulated golf area can include a variety of golf ball lies.

BACKGROUND

Golf has been historically played outside on an eighteen-hole course. Golf simulators have been developed that include a screen, a projector, and sensors for sensing golf ball movement. Simulations of actual golf courses around the world and virtual golf courses can be produced and projected on the screen. A player can play golf on a simulated golf course by hitting a golf ball into a projection of the simulated golf courses on the screen. The sensors sense the golf ball movement, and the computing system determines where on the simulated golf course the golf ball would have landed, bounced and rolled. A player can hit the next shot from the determined stopping point of the golf ball.

A method of playing golf with a simulator is described in U.S. Pat. No. 10,843,056. A method and apparatus for controlling a golf green simulator based on a green condition and a hole cup location is disclosed in KR20180098924A. A golf practice facility is disclosed in KR100647498. A virtual golf simulation apparatus is disclosed in U.S. patent application publication no. 2014/0004969A1. However, these disclosures have drawbacks including the chipping and putting aspects of the game.

An adjustable putting surface is described in United States published patent application no. 20011/0192096A1. A configurable, flexible putting green system and method that provide a golf putting experience are disclosed in U.S. Pat. No. 10,610,734. A configurable putting green is disclosed in U.S. Pat. No. 10,596,444. A floor system that has means for varying the contour of the floor vertically that can be used as an artificial putting green is disclosed in U.S. patent application publication no. 2011/0192096. A screen golf system having a "true green" is described in KR101868584B1.

The inventions described herein include improved methods and systems for playing golf by combining playing golf on a simulated golf area and a real life-golf area.

SUMMARY

A method may include providing a golf simulator comprising a computing system with real-life and/or fictional golf courses stored in memory, a projector, and a screen; projecting a simulation of a real-life or a fictional golf hole stored in memory on the screen with the computing system to provide a simulated golf hole that simulates the real-life or fictional golf hole; determining, based on one or more sensors, a position of a golf ball hit from a tee box on the simulated golf hole; determining whether the golf ball position is a putting surface; adjusting a real-life putting surface so that the real-life putting surface simulates a putting surface associated with the real-life or fictional golf hole; and if it is determined that the golf ball lie for the determined position is a putting surface, placing the golf ball on the real-life putting surface in the determined position.

The method may include having the golf simulator and the real-life putting surface in an arena where spectators can watch and listen to players playing golf using the golf simulator and the real-life putting surface.

The method may include determining whether the golf ball lie is one of a fairway position, a rough position, or a sand position. Lies can include real or synthetic lies. Golf ball lies can include lies on real or artificial grass of different heights. Lies can include lies on sand. Lies can include lies indoors or outdoors.

The method may include providing a golf ball simulation tee box that has a tee area, a fairway area, a rough area, and a sand area.

The method may include placing the golf ball in the fairway area if the golf ball lie is determined to be the fairway position, placing the golf ball in the rough position if the golf ball lie is determined to be the rough position, and/or placing the golf ball in the sand area if the golf ball lie is determined to be in a sand position. The method may include a player hitting the next shot on the golf simulator from the golf simulation area that corresponds to the lie from the last golf shot taken by that player.

The method may include adjusting a real-life chipping surface, so that the real-life chipping surface simulates a chipping surface associated with the real-life or fictional golf hole. The real-life chipping area may be in the arena. The method may include a player hitting the next shot from the real-life chipping surface if the lie of the last shot is determined to correspond to the real-life chipping surface area.

The method may include determining whether the golf ball lie is on the chipping surface associated with the real-life or fictional golf hole and placing the golf ball on the real-life chipping surface at a position that is indicative of the chipping surface associated with the real-life or fictional golf hole.

The method may include distributing digital media content of players using the simulator, the real-life putting surface, and/or the real-life chipping area so that viewers can watch and listen to players using the simulator, the real-life putting surface, and/or the real-life chipping area via a television or a computing device.

A method may include providing a golf simulator comprising a computing system with real-life and fictional golf courses stored in memory, a projector, and a screen; providing a tee box area, a fairway area, a rough area, and a sand area for hitting a golf ball that is proximal to the screen; providing a shuttle mechanism coupled to the computing system to move the tee box area, the fairway area, the rough area, and the sand area relative to the screen; projecting a simulation of a real-life or fictional golf hole stored in memory on the screen with the computing system to provide a simulated golf hole that simulates the real-life or fictional golf hole; determining, based on one or more sensors, whether a position of a golf ball hit from a tee box on the simulated golf hole is fairway, rough, or fairway bunker; using the shuttle mechanism to position the fairway area relative to the screen if the determined position is fairway; using the shuttle mechanism to position the rough area relative to the screen if the determined position is rough; and using to the shuttle mechanism to position the sand area relative to the screen if the determined position is fairway bunker.

The method may include providing the choice of selecting the fairway area, the rough area, or the sand area on a computing device and selecting the fairway area, the rough area, or the sand area based on the determined position of the golf ball.

The method may include determining whether the golf ball position is a putting surface.

The method may include positioning the golf ball on a real-life putting surface based on the determined position on the putting surface or chipping area or sand area, among others—e.g., x, y and z coordinates—and illuminating a light, such as a laser light or spotlight—on the putting surface at a location that corresponds with the determined position on the putting surface.

The method may include illuminating a light that travels along a path in the real-world golf area, stopping at the final resting point of the golf ball, such path can be determined by a bounce or roll of the virtual golf ball in the simulated golf environment. The light path can be illuminated in real time with movement of the virtual golf ball in the simulator environment.

A method may include setting in the computing system a chipping area distance based on distance from the green. The method may include determining whether the determined position of a golf ball hit from the simulated area is less than or more than the chipping area distance. If the determined position is less than the chipping area distance, the method may include positioning the golf ball on a real-life chipping area that corresponds to the determined position. The method may include determining whether the golf ball determined position is more than the chipping area distance and using the selecting mechanism to select one of the fairway area, rough area, or sand area that corresponds to the determined position.

In general, one aspect of the subject matter described in this specification can be embodied in methods that include the actions of providing a golf simulator comprising a computing system with golf courses stored in memory, a projector, and a screen; projecting a simulation of a golf hole of the golf courses stored in memory on the screen with the computing system to provide a simulated golf hole that simulates the golf hole; determining, based on one or more sensors, a position of a golf ball hit from a tee box on the simulated golf hole; determining whether the determined position is on a putting surface; adjusting a putting surface to represent a putting surface associated with the golf hole; in response to the determined position being on a putting surface, selecting a set of lights to indicate the determined position on the putting surface; and providing an instruction to activate the selected set of lights.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, the golf simulator and the real-life putting surface are in an arena. In some implementations, actions include determining whether the position of the golf ball is one of a fairway position, a rough position, or a fairway bunker position. In some implementations, actions include providing a golf ball simulation tee box comprising a tee box area, a fairway area, a rough area, and a sand area. In some implementations, actions include placing the golf ball in the fairway area if the determined golf ball position is the fairway position; placing the golf ball in the rough position if the golf ball position is determined to be the rough position; and placing the golf ball in the sand area if the golf ball position is determined to be the fairway bunker position.

In some implementations, actions include adjusting a chipping surface to represent a chipping surface associated with the golf hole of the golf courses stored in memory. In some implementations, the chipping surface is situated within an arena. In some implementations, actions include determining (i) the position of the golf ball is less than a threshold distance from the green and (ii) the position of the golf ball is not on the putting surface; in response to determining (i) the position of the golf ball is less than the threshold distance from the green and (ii) the position of the golf ball is not on the putting surface, selecting a set of lights to indicate the determined position on the chipping surface; and providing an instruction to activate the selected set of lights to illuminate a portion of the chipping surface.

In some implementations, actions include distributing digital media content of players using the simulator and the real-life putting surface to a television or a computing device. In some implementations, the golf ball hit from the tee box on the simulated golf hole is hit from a distance greater than twenty yards from the screen. In some implementations, actions include determining a ball location indicating where the golf ball hit from the tee box hit the screen.

In general, another aspect of the subject matter described in this specification can be embodied in methods that include the actions of providing a golf simulator comprising a computing system with golf courses stored in memory, a projector, and a screen; providing a tee box area, fairway area, rough area, and a sand area for hitting a golf ball that is proximal to the screen; providing a shuttle mechanism coupled to the computing system to move the tee box area, the fairway area, the rough area, and the sand area relative to the screen; projecting a simulation of a golf hole of the golf courses stored in memory on the screen with the computing system to provide a simulated golf hole that simulates the golf hole; determining, based on one or more sensors, whether a simulated golf ball position after the golf ball is hit from a tee box is located on a fairway, in rough, or on a fairway bunker of the golf hole; in response to determining the simulated golf ball position is located on a fairway, using the shuttle mechanism to position the fairway area relative to the screen; in response to determining the simulated golf ball position is located in rough, using the shuttle mechanism to position the rough area relative to the screen; and in response to determining the simulated golf ball position is located on the fairway bunker, using the shuttle mechanism to position the sand area relative to the screen.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, actions include providing the choice of selecting the fairway area, the rough area, or the sand area on a computing device and selecting the fairway area, the rough area, or the sand area based on the determined position of the golf ball. In some implementations, actions include determining whether the golf ball position is located on a putting surface. In some implementations, actions include providing an instruction to illuminate a laser light on the putting surface at a location that corresponds with the determined position on the putting surface. In some implementations, actions include adjusting the putting surface so that the putting surface simulates a putting surface associated with the golf hole of the golf courses stored in memory.

In some implementations, actions include setting in the computing system a threshold distance based on distance from the putting surface. In some implementations, actions include determining whether the golf ball position is less than or more than the threshold distance and if the determined position is less than the threshold distance, selecting one or more lights to indicate the golf ball position; and activating the one or more lights to illuminate a portion of a chipping area corresponding to the golf ball position. In some implementations, actions include in response to determining the golf ball position is greater than the threshold distance, selecting one of the fairway area, rough area, or sand area that corresponds to the golf ball position. In some implementations, actions include distributing digital media content of players using the simulator and the real-life putting surface to a television or a computing device.

Another aspect of the subject matter described in this specification can be embodied in a system that includes a first golf area for hitting a golf ball, wherein the golf area comprises one or more of a tee box area, a fairway area, a rough area, or a sand area; a second golf area comprising a chipping area and a putting area; at least one sensor for determining the position of a golf ball hit from the first golf area; a shuttle mechanism, coupled to a computing system, the tee box area, the fairway area, the rough area, and sand area, for moving the tee box area, the fairway area, the rough area, and sand area based on a determined position of the golf ball; a laser for illuminating a light in the second golf area; a projector for projecting the image and position of the golf ball hit from the first golf area; a screen, in the first golf area, for displaying the projected image and for receiving a golf ball hit in the golf simulation area; the computing system comprising one or more computers and one or more storage devices on which are stored instructions that are operable, when executed by the one or more computers, to cause the one or more computers to perform operations comprising: using the projector to display images of the golf courses stored in memory on the screen; determining, based on the at least one sensor, a position of a golf ball hit in the first golf area on a simulated golf hole being projected on the screen; determining whether the determined golf ball position is one of a fairway, a rough, a fairway bunker, a chipping, or a putting; using the shuttle mechanism to position the fairway area relative to the screen if the determined position is fairway; using the shuttle mechanism to position the rough area relative to the screen if the determined position is rough; using to the shuttle mechanism to position the sand area relative to the screen if the determined position is fairway bunker, illuminating the light on the second golf area that corresponds to the determined position of the golf ball in the second golf area.

In general, another aspect of the subject matter described in this specification can be embodied in methods that include the actions of determining a location for a golf ball on a golf playing surface, wherein the golf playing surface includes a configurable putting surface and a chipping surface surrounding at least a portion of the configurable putting surface; identifying one or more light sources that are not occluded from the location on the golf playing surface; and activating the one or more light sources to direct light at the location on the golf playing surface.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, the configurable putting surface comprises one or more actuators to adjust contours of the configurable putting surface to simulate contours of a golf putting surface. In some implementations, identifying the one or more light sources that are not occluded from the location on the golf playing surface comprises: determining a current configuration of the configurable putting surface; and identifying, using the current configuration of the configurable putting surface, the one or more light sources that are not occluded from the location on the golf playing surface.

In some implementations, identifying the one or more light sources that are not occluded from the location on the golf playing surface comprises: predicting a location of one or more players indicating where the one or more players may stand on the golf playing surface; and identifying, using (i) the predicted location of one or more of the players and (ii) a location of the hole on the configurable putting surface, the one or more light sources that are not occluded from the location on the golf playing surface. In some implementations, identifying the one or more light sources that are not occluded from the location on the golf playing surface comprises: determining a current configuration of the configurable putting surface; querying a database using the current configuration of the configurable putting surface; and identifying, based on data obtained from querying the database, the one or more light sources that are not occluded from the location on the golf playing surface.

In some implementations, identifying the one or more light sources that are not occluded from the location on the golf playing surface comprises: activating a first light source; and obtaining reflected data of the first light source. In some implementations, actions include determining, using the reflected data, that the first light source is not occluded from the location on the golf playing surface; and identifying the first light source as one of the one or more light sources that are not occluded from the location on the golf playing surface. In some implementations, actions include determining, using the reflected data, that the first light source is occluded from the location on the golf playing surface; and identifying another light source as one of the one or more light sources that are not occluded from the location on the golf playing surface.

In some implementations, activating the one or more light sources to direct light at the location on the golf playing surface comprises: generating a command configured to (i) move one or more of the one or more light sources and (ii) subsequent to moving one or more of the one or more light sources, activate the one or more light sources to direct light at the location on the golf playing surface. In some implementations, actions include determining a second location for a second golf ball on the golf playing surface; identifying the one or more light sources are not occluded from the second location on the golf playing surface; identifying one or more different light sources that are not occluded from the location on the golf playing surface; and activating (i) the one or more light sources to direct light at the second location on the golf playing surface and (ii) the one or more different light sources to direct light at the second location on the golf playing surface. In some implementations, actions include determining the one or more light sources are the only one or more light sources that are not occluded from the second location on the golf playing surface from among a set of two or more light sources.

In some implementations, actions include determining a second location for a second golf ball on the golf playing surface; identifying a second set of one or more light sources that are not occluded from the second location on the golf playing surface; and activating the second set of one or more light sources to direct light at the second location on the golf playing surface. In some implementations, the second set of one or more light sources are different from the one or more light sources. In some implementations, determining the location for the golf ball on the golf playing surface comprises obtaining data indicating a simulated position of a golf ball struck using a golf simulator; and determining the location for the golf ball on the golf playing surface as the simulated position of the golf ball.

In some implementations, the one or more light sources are mounted on a wall surrounding the configurable putting surface. In some implementations, the one or more light sources are mounted on the wall surrounding the configurable putting surface at a height of less than 50 feet. In some implementations, the light sources include a device that performs light amplification by stimulated emission of radiation.

The subject matter described in this specification can be implemented in various implementations and may result in one or more of the following advantages. For example, by using two or more light sources to indicate a ball position, a user can more easily identify the indicated position and correctly drop the ball to continue play. A two light approach can reduce light beam spread that can occur with a single light focused on a point at an angle—e.g., where an angle causes a point to be projected as an imprecise oval.

Other advantages include the ability to detect occlusions to allow for use within areas where ceiling mountings are not available—e.g., for inflatable coverings. Inflatable coverings for sporting events can be significantly more efficient from a manufacturing and setting up viewpoint. One of the benefits of this design is the light weight materials used which do not require significant time to setup and can be easily replaced if damaged. One of the drawbacks is that it can be difficult to mount items, such as lights, on such materials. Techniques described in this document solve the problem of illuminating a location for a ball drop within areas where roof mounting is not possible—e.g., due to materials used. Because mounting lights lower can present greater risk of occlusions—e.g., from players on the playing surface or undulations in a configurable green, among others—techniques described in this document determine which of one or more lights are not occluded such that light for indicating a ball position accurately illuminates a location of the playing surface and is not stopped short by an occlusion—such as a green undulation or player.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
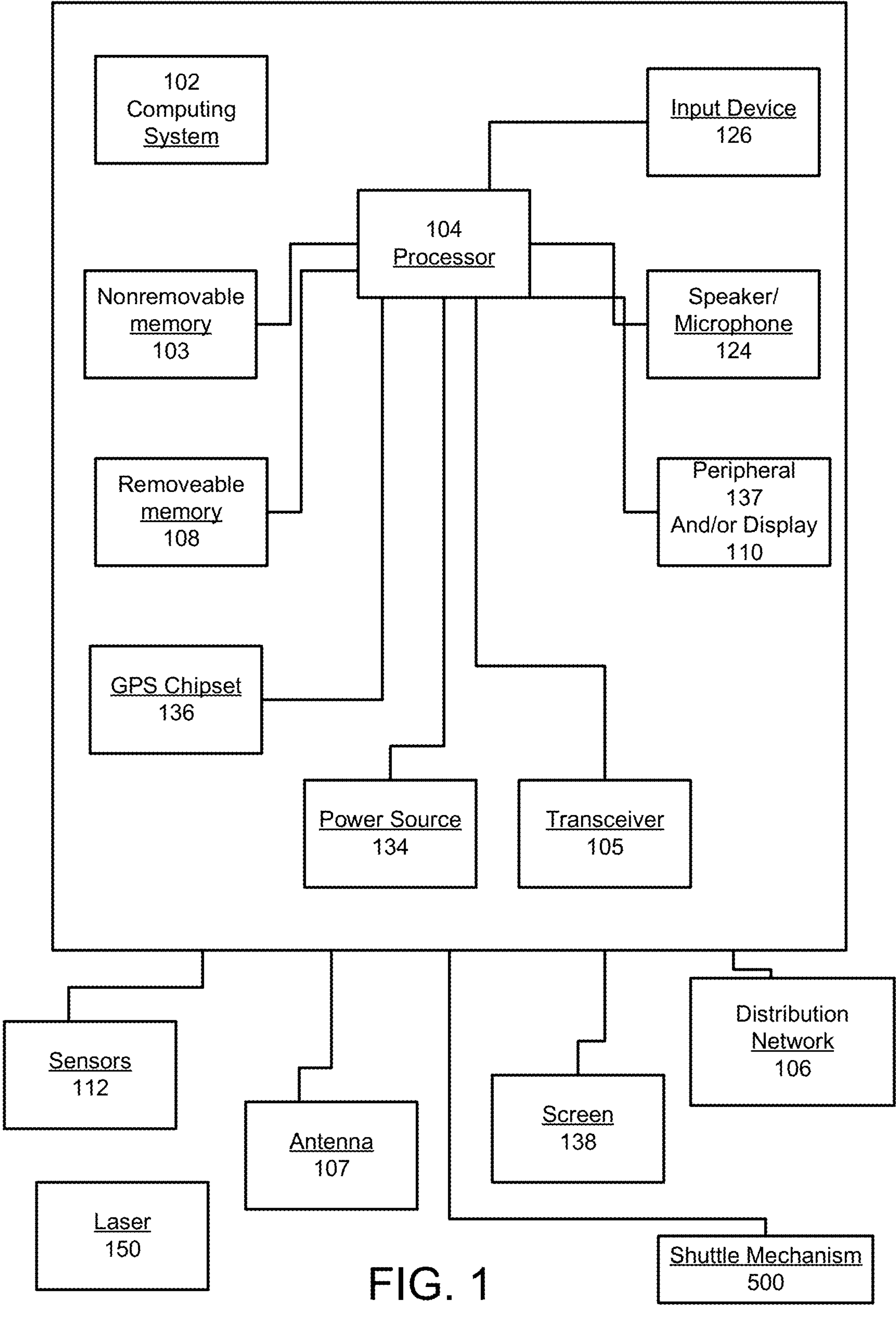
FIG. 1 is an example of a computer system.

FIG. 1 depicts a computing system 102 having a processor 104, non removeable computer memory 103, removeable computer memory 108, a display 110, an input device 126 (e.g., keypad, keyboard, mouse, among others), a speaker/microphone 124, a power source 134, a GPS chipset 136, and a peripheral 137. The peripheral 137 may be a screen for projecting images. The peripheral 137 may also be a laser that is used to illuminate a laser light. The computer memory can have real-life golf courses stored in memory 103 or 108 for projection by the projector on the peripheral screen 138. The computing system 102 may have a transceiver 105 and an antenna 107 for sending and receiving communications. The computing system 102 may be connected to a digital distribution network for distributing digital content such as television signals and/or streaming services. The system may also be electrically connected to sensors 112 that sense golf ball movement and determined the stopping point of a golf ball that is hit in the simulated golf area. As systems of this type for storing real-life golf courses and projecting them onto a screen are known to those of ordinary skill in the art, they are not described in more detail.

Figure 2:
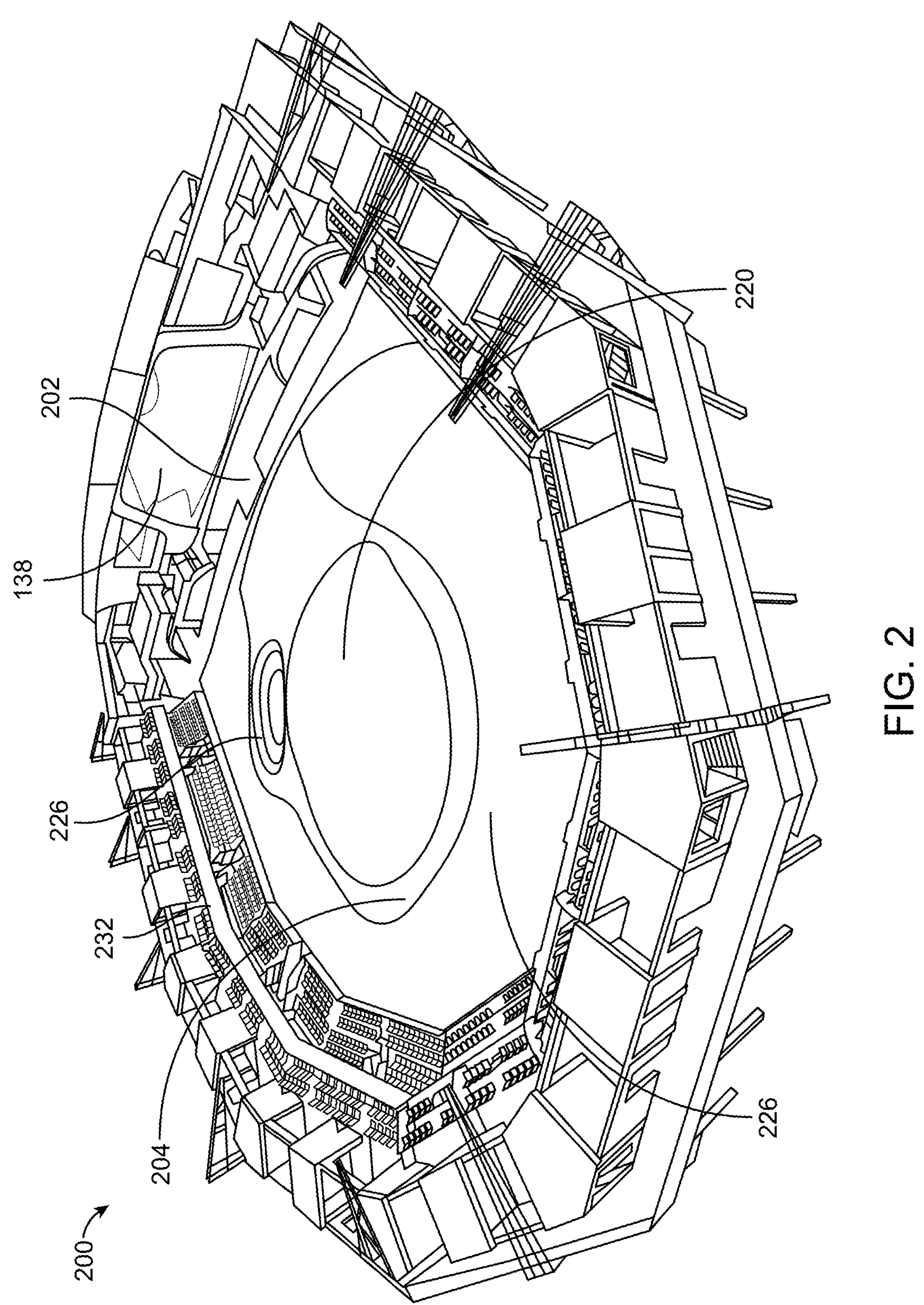
FIG. 2 is an example of a simulator golf area and a real-life golf area.

FIG. 2 depicts an area or stadium 200 having a golf simulation area 202 and a real-life golf area 204. FIG. 2 shows a screen 138. In some implementations, the screen 138 is a large format screen configured to show one or more of a course, ball path within the simulator, and a calculated path of the ball—e.g., based on flight and spin characteristics. In some cases, the large format screen is configured to allow tee shots further away from the screen. Allowing tee shots further from the screen can increase an accuracy of subsequent tracking methods for determining a position for a second shot subsequent to the tee shot on the playing course. The large format screen can also be configured to allow an audience, e.g., in a stadium watching players, view details of the shots, players, course, overall game, among other details.

In some implementations, the golf simulation area 202 includes a shuttle mechanism to allow for multiple different surfaces to match ball location indicated by a simulation. FIG. 2 shows a putting area 220. In some implementations, the putting area 220 is programmable. For example, the putting area 220 can include a turntable configured to change features of the putting area 220—where the features of the putting area 220 include elevation, texture, arrangement, among others. Course elements surrounding the putting area 220 can include hazards that are covered or uncovered to provide unique layouts for each hole.

Figure 3:
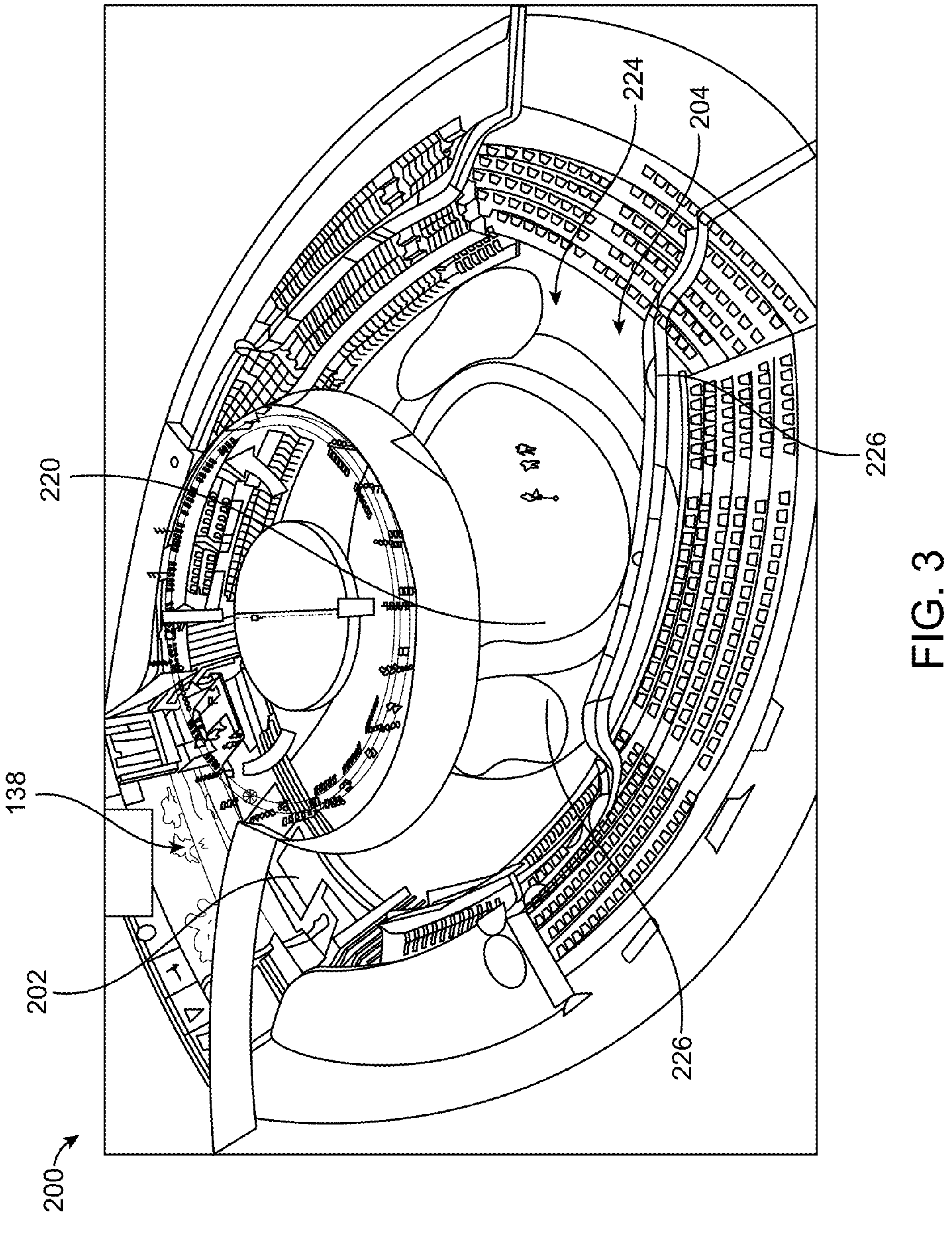
FIG. 3 is a second example of a simulator golf area and a real-life golf area.
Figure 4:
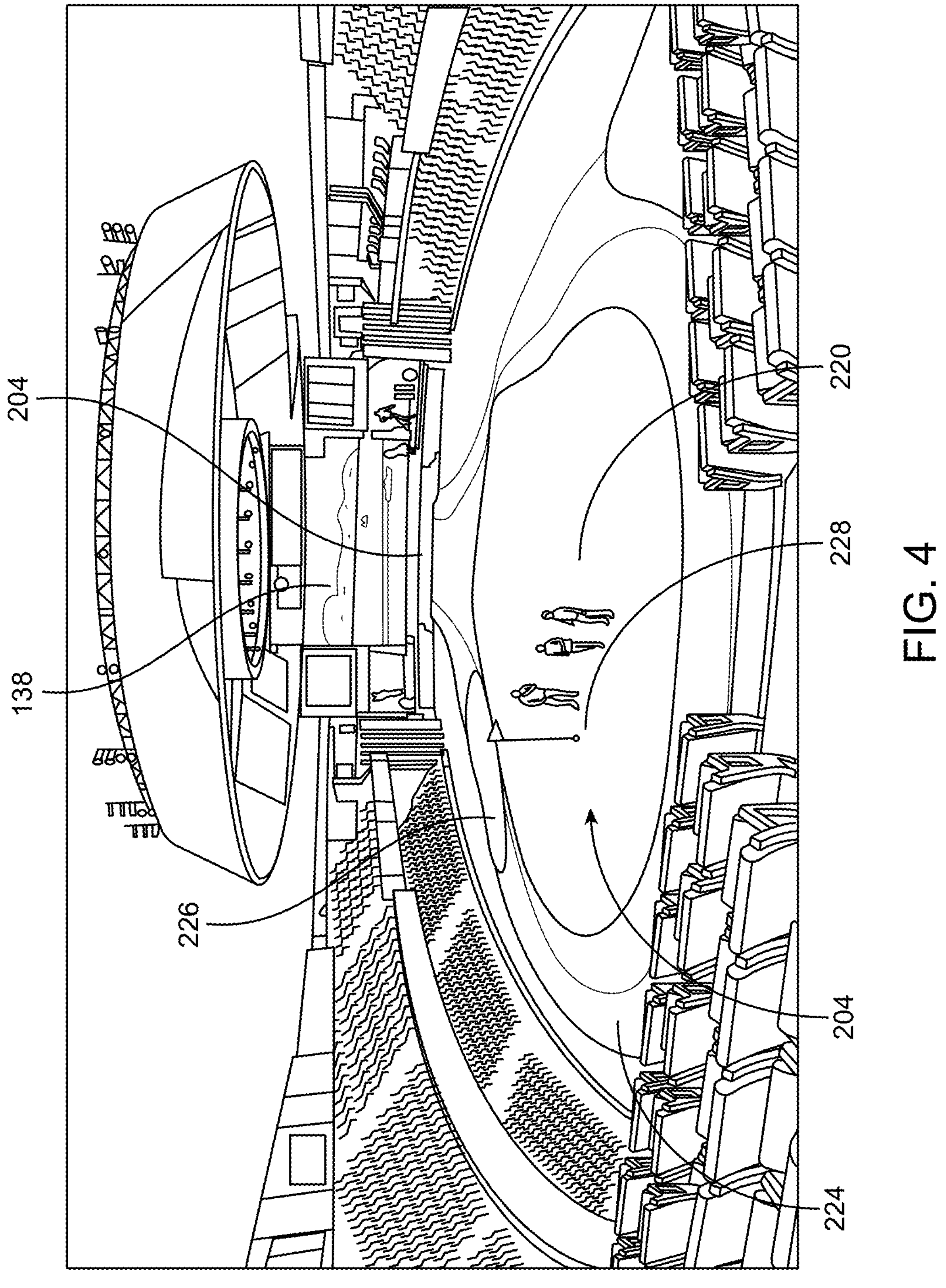
FIG. 4 is another view of the simulator golf area and the real-life golf area of FIG. 3.

FIGS. 3 and 4 provide two perspective views of another example of a stadium 200 having a golf simulation area 202 and a real-life golf area 204.

Figure 5:
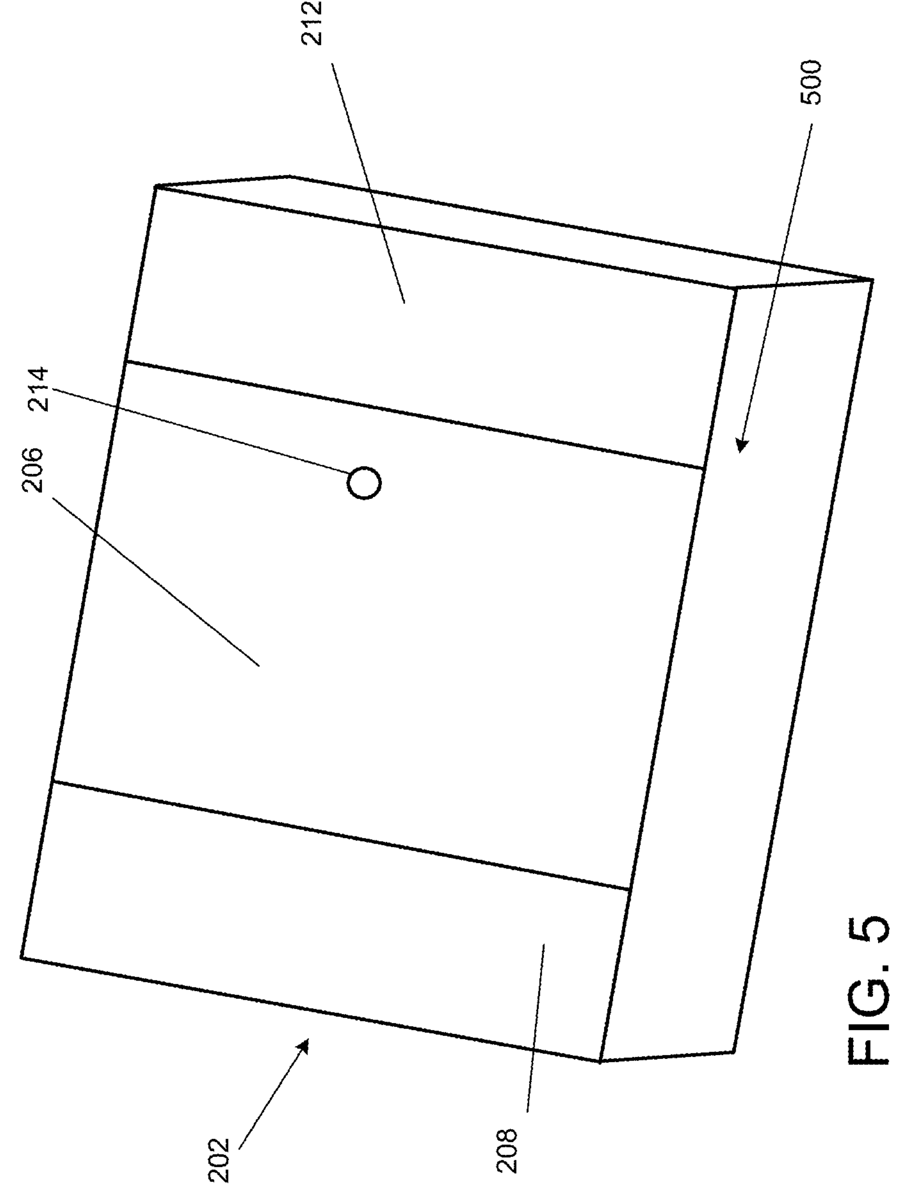
FIG. 5 is a diagrammatical view of a simulator golf area having different hitting surfaces.

FIG. 5 depicts a diagrammatical view of the golf simulation area 202. The golf simulation area 202 may have a tee box 206, a fairway area 208, a rough area 210, and a sand area 212. The tee box 206 has relatively short length, either real or artificial, grass having a length similar to the length of grass for a real-life golf tee box. The tee box area 206 has a hole 214 for placing a golf tee so that a golfer can hit from a golf tee. Alternatively, a player can hit a golf shot without a tee from the tee box area 206 from the tee box area grass. The fairway area 208 has relatively short length grass, either natural or artificial grass, that is akin to the length of grass on a real-life golf course fairway. The rough area 210 has grass, either natural or artificial, that is akin to the length of rough grass on a real-life golf course. The sand area 212 has sand that is similar to sand found in a fairway bunker on a real-life golf course.

A shuttle mechanism 500 may be used to move the tee box area 206, the fairway area 208, the rough area 210, and the sand area 212 relative to the screen 138, so that one of the tee-box 206, the fairway area 208, the rough area 210, and the sand area 212 is positioned in a desired position relative to the screen. Typically, the desired position is substantially centered in front of the screen. The shuttle mechanism 500 may be electronically coupled to the computing system 102, as shown in FIG. 1, and controlled by a touch screen or other input device 126 from the computing system 102. In some implementations, the shuttle mechanism 500 automatically adjusts according to a determined stopping location of a ball in the simulator. For example, the shuttle mechanism can be equipped with one or more processors, or communicate with the simulator, that determine a stopping location of a ball and adjust the location of the tee box or surface of the tee box that matches a location of a ball in the simulator. The computing system keypad or other input device 126 may be used after a golf shot to select one of the tee-box area 206, the fairway area 208, rough area 210, and the sand area 212. By selecting the tee box 206, the fairway area 208, rough area 210, and/or the sand area 212, the selected area is positioned in a predetermined position relative to the screen 138. The predetermined position is preferably centered (e.g., substantially centered) relative to the screen 138.

The golf simulation area 202 may have a screen 138 for receiving the projection of an image from the projector of a real-life golf course on a hole-by-hole basis. The golf simulation area 202 may have sensors 112 for sensing the movement of a golf ball hitting a golf ball into the screen 138. The sensors 112 are connected to the computing system 102. The computing system processor can determine the location on a real-life golf course of a golf ball hit from the golf simulation area 202 based on the sensor input and the lie corresponding to the lie where the golf ball stopped moving after the last shot.

The real-life golf area 204 may have a putting area 220 (e.g., green), a chipping area 224, and one or more sand traps 226. The putting area 220 is adjustable to move the contour of the putting area to mimic that of a real-life golf hole. The putting area has a golf hole 228. Such systems are known in the art and can be found in for example U.S. Pat. No. 10,596,442. The putting area 220 may have a plurality of golf holes. The golf hole in the real-life golf area most closely corresponding to the golf hole being simulated can be selected for play. The golf holes not selected for play may be covered with artificial or natural grass. The chipping area 224 can also be adjustable to mimic the contour of a real-life golf hole. The chipping area 224 preferably has natural or artificial grass of varying lengths that correspond to that of a real-life golf hole. For example, the real-life chipping area may have long grass corresponding to rough, fairway length grass, and other areas of varying grass lengths. The chipping area 224 may also have one or more sand traps 226.

The shuttle mechanism 500 may be used to move the tee box 206, the fairway area 208, the rough area 210, and the sand area 212 based on the last shot by a player. For example, for the first shot of a hole, the shuttle mechanism positions the tee box area 206 in front of the screen 138, preferably substantially centered in front of the screen 138. If the position of a golf ball is determined to be in the fairway, the shuttle mechanism 500 positions the fairway area 208 in front of the screen 138, preferably substantially centered in front of the screen 138. If the position of a golf ball is determined to be in the rough, the shuttle mechanism 500 positions the rough area 210 in front of the screen 138, preferably substantially centered in front of the screen 138. If the position of a golf ball is determined to be in a fairway bunker, the shuttle mechanism 500 positions the sand area 212 in front of the screen 138, preferably substantially centered in front of the screen 138. If a player finishes a golf hole in the real-life area, the shuttle mechanism 500 positions the tee box area 206 in front of the screen 138, preferably centered in front of the screen 138, for that player's next shot.

The shuttle mechanism 500 moves the tee box 206, the fairway area 208, the rough area 210, and the sand area 212 in response to the computer processor. For example, the computer processor can send a signal to the shuttle mechanism to moves the tee box 206, the fairway area 208, the rough area 210, and the sand area 212. The computer processor can move tee box 104, the fairway area 208, the rough area 210, and the sand area 212 in response to the determined position of the golf ball based on the sensors.

Figure 6A:
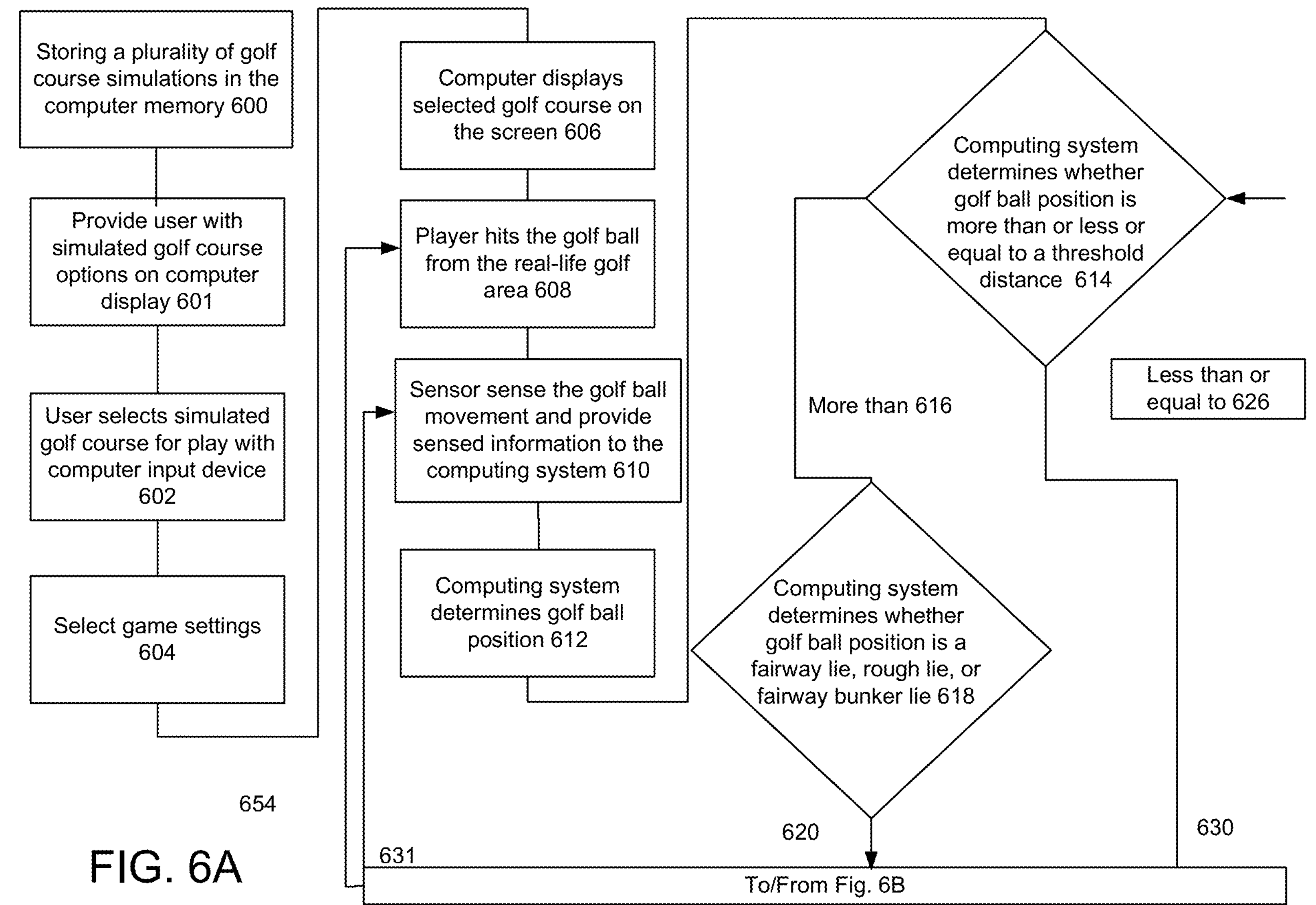
FIG. 6A is a flow chart example of a method of playing golf.
Figure 6B:
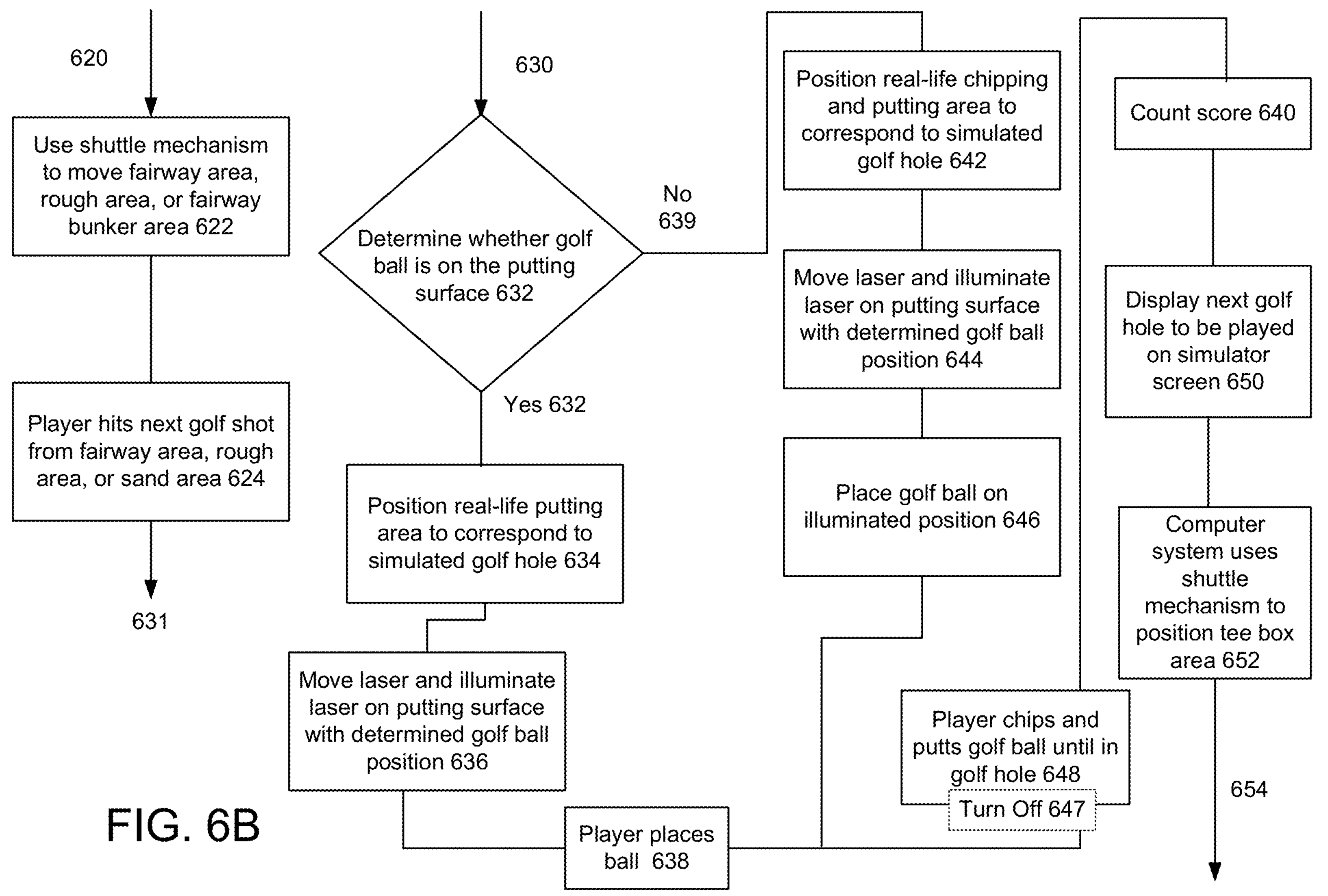
FIG. 6B is a flow chart example of a method of playing golf.

FIGS. 6A-6B depict a flow chart for at least some methods described herein. Unless otherwise restricted herein, the steps can be performed in different orders and be within the scope of the inventions described herein. A method is disclosed that includes playing a golf game by placing a golf ball in the real-life area with a lie corresponding to the lie of the last golf shot taken in the simulated golf area. For example, a laser 150 is used to illuminate the position of the golf ball in the real-life golf area based on the last golf shot in the simulated golf area. The laser 150 can be positioned by the computer software based on the stopping point of the last golf shot to illuminate a laser light (or other light can be used) on an area on the real-life golf area that corresponds to the location of rest of the last golf shot in the simulated area.

The computing system processor can be programmed with executable instructions for the computing functions described in FIGS. 6A and 6B. A method of playing golf with the golf simulation area 202 and the real-life golf area 204 with the computing system 102 may include storing (600) a plurality of real-life or simulated golf courses in the computer memory 103 and/or 108. A simulated real-life golf course includes real-life golf courses and/or one or more golf holes from real-life golf course combined together to play a combination of golf holes. Alternatively, the stored golf-courses can be fictional golf courses and/or a combination of real and fictional golf courses. At step 601, the computing system 102 provides a user with a plurality of golf courses simulated for play on the screen 138 and/or the computer display. A user can select (602) one of the stored real-life golf courses for playing with the input device 126 and input that selection to the processor. At step 604, the one or more users can select settings for the game such as tee boxes to hit from, handicaps, the chipping distance, and/or order of play and input those selections to the processor. A hole from the real-life golf course, typically the first hole is displayed (606) by the processor and projected onto the screen 138 by the computing system 102 and/or on the display.

At 608, a player can hit the golf ball from the real-life golf area, preferably the tee box area 206 into the screen. At 610, the sensors can sense the movement of the hit golf ball and provide that information to the computing system processor. At step 612, the computing system processor determines the position of a golf ball after a player hits a shot on a simulated golf course based on the sensor input.

At step 614, the computing system processor determines whether the golf ball position is more or less than a threshold distance—e.g., from a hole of the green or a center of the green. If the computing system processor determines that golf ball position is more than the threshold distance (e.g., a distance indicating a maximum chipping distance), 616, the computing system processor determines whether the determined position is a fairway lie, a rough lie, or a fairway bunker lie (e.g., a sand lie that is further from the golf hole than the chipping distance) at 618. Following the flow chart at 620 from FIG. 6A to 6B, at step 622, the computing system processor uses the shuttle mechanism to center the fairway area relative to the screen if the determined golf ball position is fairway, center the rough area relative to the screen if the determined golf ball position is rough, and center the sand area relative to the screen if the determined golf ball position is in a fairway bunker. The player hits the next shot from the selected fairway area, sand area, or rough area 624. At 631 and following the flow chart from FIG. 6B to FIG. 6A, the sensors sense the golf ball movement (e.g., speed and acceleration in various directions, spin, rotation along various axes) and provides the sensed information (e.g., speed relative to different axes (e.g., x, y, z), acceleration relative to different axes (e.g., x, y, z), rotation in various axes (e.g., x, y, z)) to the processor and the steps are repeated from 612.

If the computing system processor determines that the golf ball position is less than or equal to the threshold distance (614, 626) (following from Flow Chart 6A at 630 to flow chart FIG. 6B), the computing system processor determines at 632 whether the determined position is on a putting surface. If the determined position is a putting surface 632, the real-life putting area is positioned (e.g., by the processor) at 634 to simulate the contour of the putting area of the hole being played and/or the hole on real-life putting area best corresponding to the hole being played is selected based on position and/or contour. If the determined position is a putting surface, the computing system processor moves the laser (636) and illuminates the laser so that the laser light corresponds to the position of the golf ball on the putting surface.

In some implementations, illuminating the laser so that the laser light corresponds to the position of the golf ball on the putting surface, or other surface in a playing area including chipping surfaces, sand traps, among others, includes determining one or more occlusions. For example, the computing system processor can determine that one or more lights will be, or are, occluded from a particular position—e.g., a position of the golf ball on the putting surface. Occlusions can include players walking between a light and the particular position, reconfigurable green shaped such that the green occludes the light from the particular position, among other features or objects—e.g., in the stadium 200.

In some implementations, determining one or more lights are occluded from a particular position includes obtaining feedback data from one or more lights. For example, lights can include light detection and ranging (LIDAR). Feedback from light reflected can be used—e.g., by the computing system processor—to determine whether a light is occluded or not. In some implementations, the computing system processor determines a distance covered by a light does not match an expected distance. For example, the computing system processor can determine a distance covered by a light is less than an expected distance indicating that a light is occluded.

In some implementations, in response to determining one or more lights will be, or are, occluded from a particular position, a computing device activates one or more other lights to illuminate a particular position. For example, in response to determining a first light is or will be occluded from shining light at a particular position on the putting surface, the computing system processor can activate a second light to illuminate the particular position.

In some implementations, determining one or more lights will be occluded from a particular position includes obtaining data of a configurable green. For example, the computing system processor can obtain data indicating a current position of the putting area 220. The putting area 220 may include peaks and valleys such that a light in the stadium 200 is unable to light a particular position on the putting area 220. The computing system processor can determine, based on (i) a geometry of a line from a first light to a particular position on the putting area 220 and (ii) a configuration of undulations on the putting area 220, whether a given light will be occluded from a particular position. The computing system processor can obtain the particular position on the putting area 220 from a simulation and use a model of the stadium—including a position of one or more lights—to determine if one or more lights are occluded from the particular position. The computing system processor can obtain data indicating undulations of the putting area 220—e.g., from a system that controls undulations and other changes of the putting area 220.

Additionally, some occlusions can be known based on the shape of the green even before any positioning of players comes into play. The added active occlusions, where a player moves, may shift. Some can be expected, such as where the player may need to stand to hit a next shot—e.g., putt or chip—while others may be based on playing partners, teammates, opponents, among others. Occlusions may change several times during a play of a hole. For example, based on calculations, hole position, among others, any number of combination of lights may be best suited for a hole at a given time. A combination of lights best suited for a hole—e.g., not occluded from a particular position to be lighted—can change during a play of a hole. In some implementations, systems actively update activated lights as occlusions occur. In some implementations, systems activate lights—e.g., 3 lights—to ensure or increase a likelihood that non-occluded lights are active during play of a hole—e.g., robust against players walking between a light source and a particular location to be lit.

The player places the golf ball on the illuminated position (638). The player putts or chips on the real-life playing area (648) until the ball is in the golf hole and the score is recorded (640). Step 634 of positioning the putting area can be performed at various times including before or after a golfer tees off for a hole.

If the computing system processor determines that the golf ball position is less than the chipping distance and determined position is not on a putting surface (639), the golf ball is determined to be on in the real-life chipping area (639). The real-life chipping area is positioned 642 by the processor to simulate the contour of the chipping area of the hole being played and the real-life putting area is positioned by the processor to simulate the contour of the golf hole being played from the perspective of the chipping position and/or a golf hole in the real-life putting area is selected that best corresponds to the simulated golf hole based on position and/or contour. The computing system processor moves the light, such as a laser or spotlight beam, and illuminates the light (644) so that the laser light corresponds to the position of the golf ball on the real-life chipping area. The player places or drops the golf ball on the illuminated position (646). The computing system processor can, optionally, automatically turn off the light after the ball is placed or dropped (647). In some implementations, the computing system processor determines when the ball is within a threshold distance from the illuminated position or when the ball is at rest within the threshold distance. In response to determining the ball satisfies one or more placing criteria, such as being within a threshold distance from the illuminated position, the computing system processor can turn off the light. The player putts or chips on the real-life chipping area (648) until the ball in in the hole and the score is recorded (640). Step 642 can be performed at various times including before or after a golfer tees off for a hole.

After playing a golf hole, the computing system processor can display 650 the next golf hole to be displayed from the perspective of the next tee box on the screen (648). The tee box area can be positioned 652 with the shuttle mechanism 500 to move the tee box area relative to the screen (e.g., preferably centered). The player can then play the next hole (following from FIG. 6B to FIG. 6A at 654). Steps 608 through 654 can be repeated for the desired number of holes or course to be played. Score can be kept in accordance with rules of golf such, as the USGA or PGA rules, as modified to accommodate the combination of real-life golf and simulation including for example no penalty for placing the ball in the real-life golf area or in the simulated area. Local golf rules can be adopted and used. For example, if a player hits a golf ball from the real-life golf area out of the real-life golf area (e.g., into the stadium stands), a one stroke and distance penalty can be assessed with the player dropping the ball at the last location struck and hitting the next shot from that location.

The methods and systems of FIGS. 6A and 6B are described with respect to one player. However, multiple players can play sequentially. For multiple players, steps 608-612 can be repeated for each player. When it is the next players turn, steps 614, 616, 618, 620, 622, 624, 631, 610, 612 are conducted for a players second shot that is from the fairway area, rough area, and sand area in the simulated area. Steps 614, 626, 628, 630, 632-654 can be conducted. The methods can include the players taking turns after each player's shot so that a player's turn stops at 638 or 648 and the players take turns chipping and/or putting until the ball in the in hole and the score is recorded. Other variations of players taking turns can be used. For example, a player could putt out the hole. Player turn can be based on distance from the hole and/or based on published golf rules or local rules.

The systems and methods disclosed herein may further include systems for broadcasting and/or streaming the golf game being played. For example, the players playing the golf game can be viewed on live broadcasted television or live streaming using a distribution network 106. The network 106 can include digital or analog broadcasted television. Broadcasting with the network 106 includes over the air broadcasting and broadcasting over electrical means such as via cable networks, Wi-Fi, cellular, high-definition television, digital television, and other content distribution systems that are known in the art.

Computing system 102 as described herein can be one or more computing systems. For example, the computing functions can be split between processors and computers/servers. The memory can be integral or nonintegral to the computing system. Cloud services are included within the term computing system 102 as described herein.

Figure 7:
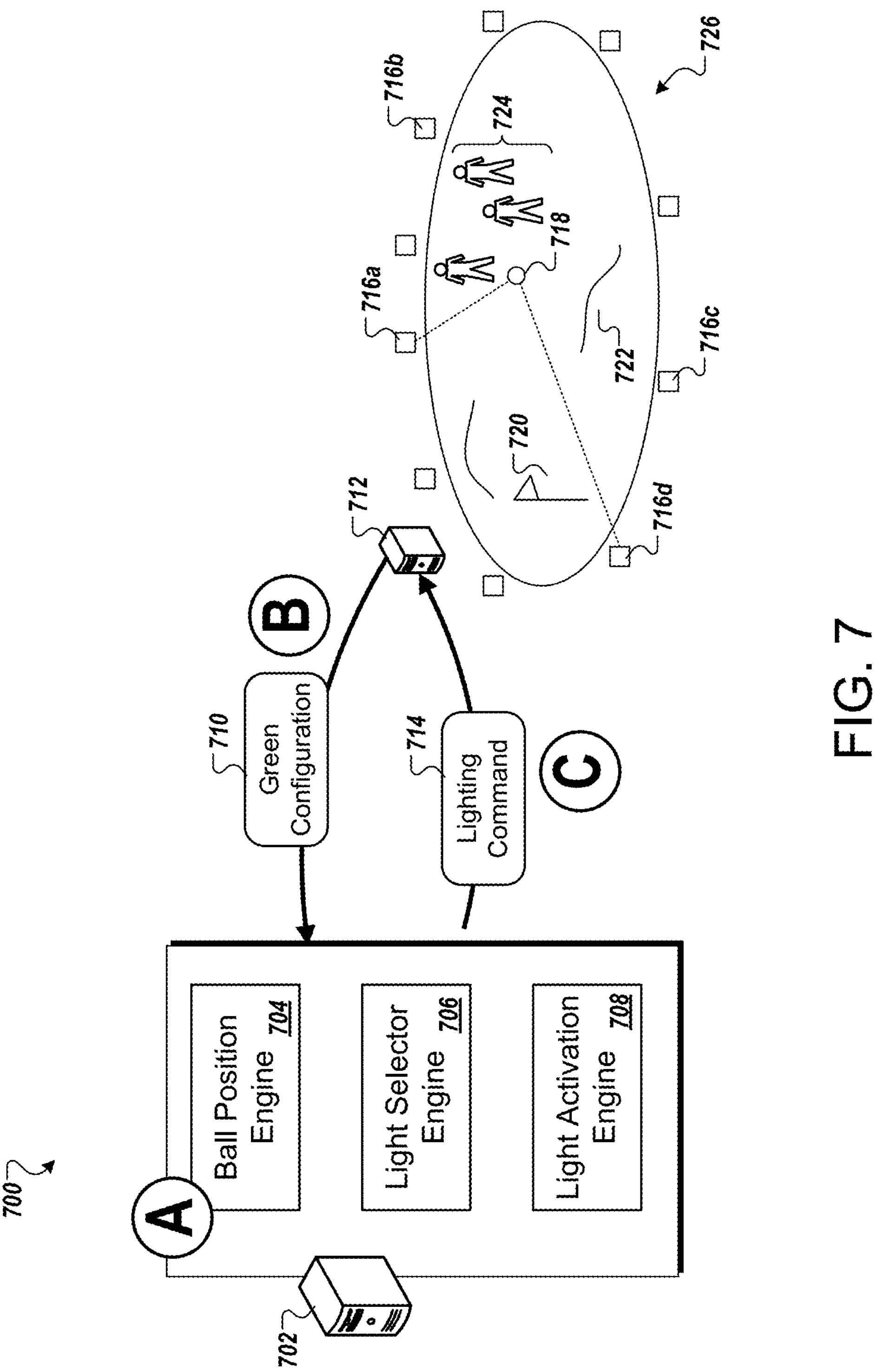
FIG. 7 is an example of a system for accurate object location within a golf simulator system.

FIG. 7 is an example of a system 700 for accurate object location within a golf simulator system. The system 700 includes a controller 702 that controls one or more lights—including lights 716*a-d*—in area 726. The lights can be stationary or movable—e.g., by one or more controls signals from the controller 702 on rails, wires, or other suitable method of movement. The area 726 can be similar to stadium 200 and used for playing of a hybrid simulator and real-life golf game.

In some implementations, light selection and activation is of importance for inflatable arena structures. For example, as shown in FIG. 2, an arena can include stands without a hard roof. Instead of a hard roof, an inflatable roof can be used—e.g., a material held aloft either by a pressure difference from inside of the arena compared to outside or guiding rods or both. The inflatable roof can reduce costs of construction. One drawback of the inflatable roof is the roof may not be sufficiently rigid to allow for mounting of lights. Instead, lights can be mounted along an edge of stands—e.g., stands 232. The lower mounting can create the possibility of occlusion by various objects, such as undulations of the configurable green as well as players. Techniques described in this document and in reference to FIG. 7 solve this particular problem and enable the use of soft-shell roofing to lower constructions costs of arenas used for hybrid simulation and real-world golf play—where simulation golf can include ball trajectories at least partially simulated and real-world golf play can include ball trajectories occurring in the real world without computer simulations.

In FIG. 7, the controller 702 is equipped with a ball position engine 704, a light selector engine 706, and a light activation engine 708. The ball position engine 704, the light selector engine 706, and the light activation engine 708 can be configured as one or more software modules running one or more processors of the controller 702. The controller 702 can include one or more computers—e.g., connected by one or more wired or wireless connections to perform the operations described in reference to FIG. 7 and those discussed in reference to the systems and processors as described in this document.

In general, the controller 702 determines one or more lights to activate in the area 726. The controller 702 can determine which one or more lights are not occluded—e.g., blocked by features of the green, such as hill 722, or other objects, such as players 724. The controller 702 can determine a particular position in the area 726 to light with the one or more lights. The particular position can represent a location of a golf ball to be struck by one or more of the players 724 in a subsequent shot. For example, one of the players 724 can drive a golf ball in a virtual simulation. Based on the simulated ball path, the controller 702 can determine a location for a subsequent shot. In some implementations, the location for the subsequent shot is on a green, as shown in the area 726.

For ease of explanation, the processes of FIG. 7 are described in stages A through C. Although described in order from stage A to C, in some implementations, stages occur at partially simultaneously—e.g., on parallel processors or multiple computers—or in different orders.

In stage A, the ball position engine 704 of the controller 702 obtains a ball position. In the example of FIG. 7, the ball position engine 704 obtains data indicating the ball position is position 718 shown in the area 726.

In some implementations, the ball position engine 704 obtains a ball position from a golf play simulator. For example, the ball position engine 704 can obtain a ball position from a simulation of a shot struck from tee box 206. In some implementations, the controller 702 simulates the ball path. In some implementations, the controller 702 communicates with one or more computers that perform one or more simulations to simulate a golf ball path and golf ball position—e.g., on a green, as shown in the area 726.

In stage B, the controller 702 obtains green configuration 710. In some implementations, the controller 702 obtains the green configuration in response to one or more determinations—e.g., the controller 702 determining there is a new active hole in the game, the controller 702 determining one or more shots indicate that a player's next shot will be from the green. The green configuration 710 can include data indicating a configuration of the green shown in the area 726—e.g., hill 722, among other features. In some implementations, the green configuration 710 is sent by a green configuration system 712. For example, the green configuration system 712 can include one or more computers that control the configuration of the green shown in the area 726. In some implementations, the controller 702 controls the configuration of the green shown in the area 726. For example, the green configuration system 712 can be included as one or more processors of the controller 702.

The light selector engine 706 can determine which of the one or more lights—including lights 716*a-d*—in area 726 to select for activation. Activation can include illuminating and positioning the light to shine or illuminate a location in the area 726. The location can indicate a location from which a next shot is to be taken.

In the example of FIG. 7, the light selector engine 706 determines that the light 716*c* is occluded from the position 718 determined by the ball position engine 704. In particular, the light selector engine 706 determines that the hill 722—using the green configuration 710—is a feature blocking light from the light 716*c* from reaching the position 718.

In some implementations, the controller 702 sends one or more signals to occluded lights in implementations where one or more of the lights shown in the area 726 are movable. For example, the controller 702 can move lights until there are not occluded or can determine a location where the light is not occluded and move the light to that determined location.

In some implementations, the light selector engine 706 determines the light 716*c* is occluded using three-dimensional information of the green configuration 710. For example, the green configuration 710 can include three-dimensional information indicating the contours of the green shown in the area 726. By determining a line from the light 716*c* to the position 718, the light selector engine 706 can determine if any feature of the green configuration 710 intersects and therefore blocks the light from the light 716*c*. In some implementations, such potential occlusions may be determined prior to a game or match, such that during play on some holes of a course, certain lights may be known to be occluded based on the known three-dimensional shape of the green configuration 710 and the location (e.g., height and angle) of the lights 716*a-d*, in combination with a particular hole or pin position and/or ball position. If a ball is determined to be in a particular occluded position for one or more of the lights 716*a-d*, the light selector engine 706 can determine a particular light should not be used.

In some implementations, the light selector engine 706 determines the light 716*c* is occluded using feedback from the light 716*c*. For example, the light 716*c* can be configured with one or more sensors to detect feedback from light emitted by the light 716*c*—e.g., LIDAR. In some cases, the system 700 includes one or more cameras. The one or more cameras can provide image data to the controller 702. The controller 702 can operate one or more vision processing algorithms to determine one or more occlusions. The one or more cameras can provide live images of the green or other playing surface.

The light selector engine 706 can also obtain data from other sensors that obtain feedback data from the light 716*c*. Using feedback data obtained from one or more sensors, the light selector engine 706 can determine if light emitted from the light 716*c* traveled a distance corresponding to an expected distance. For example, using a LIDAR approach, the light selector engine 706 can compare a detected distance of the light to a distance from the light 716*c* to the position 718. Based on a comparison satisfying a threshold—e.g., less than or different by a specific amount—the light selector engine 706 can determine that the light 716*c* is occluded from the position 718. In response, the light selector engine 706 can select one or more other lights to emit light for marking the position 718. In some implementations, using a model to preemptively detect whether or not a light is occluded is preferable to decrease a wait time between a position determined to be lit and the position being lit by un-occluded lights.

In the example of FIG. 7, the light selector engine 706 determines that light 716*b* is occluded by a person of the persons 724. In some implementations, the light selector engine 706 determines that the light 716*b* is occluded by predicting a location of the person of the persons 724. For example, the light selector engine 706 can predict a location of a person approaching to take a shot at the position 718. In some implementations, the light selector engine 706 obtain details of players for determining a location of players. For example, the light selector engine 706 can obtain details of a player's handedness—e.g., to determine that lights may be occluded if located such that the player lines up to take the shot on that side. For instance, in a particular position, a right-handed player's normal putting stroke stance and position may not cause occlusion issues with a particular hole. However, if a left-handed player uses their normal putting stroke stance and position from the same particular ball position, an occlusion may occur.

In some implementations, the light selector engine 706 obtains data of the current hole—e.g., a hole location on the green shown in the area 726. For example, the hole location can impact where a player stands and, potentially, which lights of the lights 716*a-d* are occluded from the position 718.

In some implementations, the light selector engine 706 determines that the light 716*b* is occluded by detecting feedback from light emitted by the light 716*b* and determine, using the feedback from light emitted by the light 716*b*, that the light 716*b* is occluded. For example, the light selector engine 706 can determine that light emitted by the light 716*b* did not travel a determined distance. The light selector engine 706 can determine an expected distance indicated a distance that light from the light 716*b* would travel from the light 716*b* to the position 718. If, based on data from one or more sensors configured to sense light feedback from light emitted by the light 716*b*, the light selector engine 706 determines that the light distance does not satisfy a threshold—e.g., is less than the expected distance—the light selector engine 706 can determine that the light 716*b* is occluded. In response, the light selector engine 706 can select one or more other lights for light emission.

In some implementations, lights at different heights are used to offer additional opportunities to use nonoccluded lights. In some implementations, the controller 702 is communicably connected to a database indicating predetermined light selections for particular positions. For example, the lights 716*a* and 716*d* can be used for any position which a first region of the green shown in the area 726 and the lights 716*b* and lights 716*a* can be used for any position within a second position. Other light combinations can be stored for other regions. In some implementations, all regions for green configurations are associated with particular lights. For example, the light selector engine 706 can query a stored database using green configuration data to determine one or more lights to be selected for activation.

In stage C, the controller 702 generates the lighting command 714. In some implementations, the light activation engine 708 provides the lighting command 714 to the green configuration system 712. As described, the green configuration system 712 can be a separate processing system in control of configuring the green shown in the area 726 or be part of the controller 702.

In some implementations, the light activation engine 708 obtains data from the light selector engine 706. For example, the light activation engine 708 can obtain data from the light selector engine 706 indicating an identifier of one or more lights to be activated. In the example of FIG. 7, the light selector engine 706 selects lights 716*a* and 716*d* after determining the lights 716*b* and 716*c* are occluded from emitting light to light the position 718. In some implementations, the light selector engine 706 provides an identifier for one or more selected lights. For example, the light selector engine 706 can provide an identifier of the light 716*a* and an identifier of the light 716*d*.

In some implementations, the light activation engine 708 uses one or more identifiers determined by the light selector engine 706 to generate the lighting command 714. The lighting command 714 can indicate light to be emitted by the lights selected by the light selector engine 706. The lighting command 714 can indicate an angle or position of the selected lights such that the light emitted from the selected lights accurately light the position 718.

In response to providing the lighting command 714, the lights 716*a* and 716*d* can be activated to light the position 718. In some implementations, the controller 702 provides an indication that a ball has been successfully placed at the position 718 indicated by the selected lights. For example, the controller 702 can change a color of light emitted (e.g., from red to green) or turn light on or off (e.g., flash lights) among other indications after a player successfully places a ball at the position 718. Successfully placing a ball can include placing a ball within a threshold distance (e.g., a centimeter) from a position 718 determined by a simulator after one or more shots by a player in the area 726.

In some implementations, light from the lights 716*a-d* is laser light. In some implementations, light from the lights 716*a-d* is a three-dimensional projection. These are merely examples and the light can include other forms of light to indicate light at a given position—e.g., the position 718.

In some implementations, the controller 702 obtains sensor data after a player places a ball at the position 718. For example, the controller 702 obtains image data from an image sensor—such as a camera. The controller 702 can use the image data to detect a placed golf ball in the image and compare a location of the placed golf ball to an expected location of the golf ball. For example, the controller 702 can translate a location detected of the placed golf ball to a location in a three-dimensional model of the area 726. The controller 702 can compare the location of the position 718 with the location of the detected placed golf ball. If the distance between the position 718 with the location of the detected placed golf ball satisfies a distance threshold, the controller 702 can activate an indication of successful ball placement—e.g., change light colors, transmit a notification to visual display, blink lights, turn off light, among others. If the distance between the position 718 with the location of the detected placed golf ball does not satisfy a distance threshold, the controller 702 can activate an indication of unsuccessful ball placement—e.g., change light colors, transmit a notification to visual display, blink lights, among others. If the controller 702 determines that a distance between the position 718 and a detected golf ball placement position satisfies a distance threshold, the controller 702 can generate and transmit a signal to extinguish the light, e.g., transmit to one or more of the lights 716*a-d* that are emitting light projected onto the position 718.

In some implementations, occlusions are known—e.g., based on positioning of green, or even likely locations based on where a ball may be. For example, if there is a ball in one spot, a system configured to activate one or more lights—such as the controller 702—can determine where a player may view or approach the shot from and where that player may stand. In some implementations, the system determines a current or predicted position of one or more persons. For example, before activating one or more lights, the system can identify which of one or more lights to activate based on a predicted location of one or more players. A prediction of location for one or more players can be based on handedness of the person—e.g., left-handed or right-handed swing.

In some implementations, the light selector engine 706 is communicably connected to a stored database of greens. For example, the light selector engine 706 can determine which positions are best suited in a vacuum and then adjust one or more selections based on secondary determinations—e.g., of where people are, or feedback from one or more lights.

In some implementations, the system 100 is used to indicate locations of multiple ball positions, such as for different players or teams competing with and/or against each other. For example, in addition to the position 718, the controller 702 can be used to indicate additional positions, such as additional positions for other virtual balls after one or more simulated golf shots by different competitors and/or different teams. In some implementations, a different set of lights or different colored lights are used to indicate different balls. For example, for a first ball position—e.g., shown as the position 718—a first set of lights (such as the lights 716*a* and 716*d*) or a first color (e.g., red) can be used to indicate the first ball position. For a second ball position, a second set of lights (e.g., a second set of lights not occluded from the second ball position) or a second color (e.g., blue) can be used to indicate the second ball position. In some implementations, one or more of the lights 716*a-d* have multiple lights or multiple colors such that the lights 716*a-d* can light two or more locations simultaneously. Processes described in reference to the single position 718 can be used for multiple positions.

In some implementations, one set of lights illuminates ball positions for two players. The system 700 can determine occlusions for two lights to be able to illuminate successfully at the same time. In some implementations, a first ball tracked from a tee area to a playing area—e.g., chipping surface, putting surface, among others—is illuminated. When a second ball enters the playing area, a second light can be used to illuminate the second ball to avoid occlusions. In some cases, multiple lights can be not occluded. If a first light is used for a first ball but the first light is the only light not occluded for a second ball, the system 700 can determine a second, different, light for the first ball—e.g., when the second, different, light is, like the first light, not occluded from a position of the first ball. In this way, the system 700 can maintain separate lighting for different balls to help with differentiation. In some implementations, light color or other features of light are used to distinguish between balls. For example, a first ball can be positioned using light of a first color—e.g., blue light. A second ball can be positioned using a light of a second color—e.g., red light.

Figure 8:
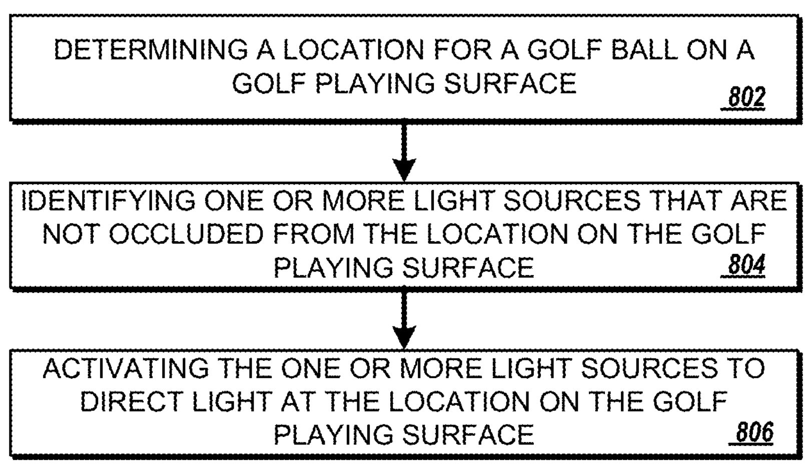
FIG. 8 is a flow diagram of an example process 800 for accurate object location.

FIG. 8 is a flow diagram of an example process 800 for accurate object location. For example, the process 800 can be used by the controller 702 from the system 700.

The process 800 includes determining a location for a golf ball on a golf playing surface (802). For example, as described in reference to FIG. 7, the ball position engine 704 can determine a ball position from a golf play simulator. The golf play simulator can have tracked a real golf ball struck from the tee box 206, e.g., into a screen. The golf play simulator can estimate a location of the golf ball within the golf playing surface.

In some implementations, the controller 702 determines a location for a golf ball after an initial putt or chip. For example, one or more indicating lights can be used instead of, or in addition to, coins, poker chips, or other ball markers used in golf when a player picks their ball up from the green. Instead of placing a ball marker, the controller 702 can identify the ball location and, after a player removes the ball, can use the determined location to identify and activate lights for the player to resume play. Light indications can be used for a first shot in a real-world play environment after a shot tracked by simulator or a subsequent shot, e.g., a shot after an initial chip or putt or after a player picks up a ball on a putting green surface.

In some implementations, the controller 702 activates lights to indicate a ball location for a player that picked up their ball—e.g., in lieu of a physical ball marker placed on the putting green. For example, the controller 702 can activate lights to indicate a location determined as the last location of the ball before the player picked up the ball. The controller 702 can operate one or more visual detection algorithms to detect a location of a ball or obtain internal ball tracking data—e.g., from a ball enabled with tracking chip or other methods to obtain a location of the ball. The controller 702 can activate the lights at a particular time to coincide with a next shot of that player—e.g., after another player has finished the hole or taken their shot. In some implementations, the controller 702 obtains a signal provided by a user indicating when to activate one or more lights for a given ball or player. For example, a user can watch the game or be a player and request that light indications be provided for a particular ball or particular player using a signal configured to control the controller 702 and send via one or more networks to the controller 702 using a device.

In some implementations, the golf playing surface includes a configurable putting surface and a chipping surface. For example, the area 726 shown in FIG. 7 can include grass, artificial turf, among other surface types. The area 726 can include portions for putting and portions for approach play, such as chipping or putting from the rough, among other approach shots. The chipping surface, including portions of surface surrounding the configurable putting surface, can include a surface where a real golf ball can be struck by a player. The golf ball can be struck with a chip shot, putting shot, among other shots. In general, the area 726 where a ball position can be indicated by one or more lights can include both configurable surfaces-such as the configurable putting surface—and non-configurable surfaces—such as a non-configurable chipping surface. In some implementations, the chipping surface is configurable. For example, the area 726 can include movable portions that simulate real world topography—e.g., mounds, or elevation changes—to add realistic qualities to the playing surface.

The process 800 includes identifying one or more light sources that are not occluded from the location on the golf playing surface (804). For example, the light selector engine 706 can determine which of the one or more lights-including lights 716*a-d*—in area 726 to select for activation. The light selector engine 706 can generally select lights to avoid occlusions. The occlusions can be determined using data indicating a current green configuration, feedback from lights sources indicating occlusions, or manual user control, among others. The controller 702 can process data streams for determining occlusions and use the data streams to identify one or more light sources that are not occluded from the location on the golf playing surface. In some implementations, the controller 702 identifies at least two light sources. The at least two light sources can be used—as shown for light sources 716*a* and 716*d*—to pinpoint a location—e.g., location 718—for a ball to be played.

The process 800 includes activating the one or more light sources to direct light at the location on the golf playing surface (806). For example, the light activation engine 708 of the controller 702 can activate lights identified by the light selector engine 706. The light activation engine 708 can activate lights until a golf ball is dropped within a threshold distance from the lit position—e.g., the position 718. For example, the controller 702 can obtain an indication of a ball dropped—e.g., from light feedback from a reflective surface of a dropped ball, manual control, a processed image stream representing a portion of the ball dropped, among others. In some implementations, the controller 702 determines a distance between a dropped ball and an indicated location. For example, the controller 702 can identify a location of the dropped golf ball using one or more data streams—e.g., visual data to be processed by one or more machine learning image detection algorithms, light feedback data, among others.

The controller 702 can compare the detected location of the dropped ball with a location indicated as the location 718. If the detected location of the dropped ball satisfies a distance threshold from the location 718—e.g., within a threshold distance, such as 1 inch—the controller 702 can send a signal to the light activation engine 708 to deactivate one or more activated lights, change or flicker lights to indicate a ball has been placed, among others. Similar light indications can be used if the detected drop location does satisfy one or more distance thresholds—e.g., change light color, blink lights, notify users using textual prompt on a device or visible screen, among others.

The order of operations in the process 800 described above is illustrative only and can be performed in different orders. In some implementations, the process 800 can include additional operations, fewer operations, or some of the operations can be divided into multiple operations.

A number of implementations have been described. Nevertheless, it will be understood that various modifications may be made without departing from the spirit and scope of the disclosure. For example, various forms of the flows shown above may be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A system for a golf game, comprising:

a first golf area for hitting a golf ball;

a second golf area comprising a putting area;

at least one sensor configured to sense movement of a hit golf ball for determining a position of the hit golf ball;

a plurality of lights for illuminating the second golf area; and one or more computers and one or more storage devices on which are stored instructions that are operable, when executed by the one or more computers, to cause the one or more computers to perform operations comprising:

determining a location that corresponds to the position of the hit golf ball on the second golf area based on sensor data from the at least one sensor;

identifying one or more lights of the plurality of lights that are not occluded from the location on the second golf area; and activating the one or more lights that are not occluded from the location on the second golf area.

2. The system of claim 1, wherein the second golf area comprises a configurable surface that comprises one or more actuators to adjust contours of the configurable surface to simulate contours of a golf putting surface.

3. The system of claim 2, wherein identifying the one or more lights of the plurality of lights that are not occluded from the location on the second golf area comprises:

determining at least one light of the plurality of lights that is occluded from the location on the second golf area by a contour of the contours of the configurable surface; and selecting one or more of the plurality of lights other than the at least one light, thereby identifying the one or more lights of the plurality of lights that are not occluded from the location on the second golf area.

4. The system of claim 1, wherein identifying the one or more lights that are not occluded from the location on the second golf area comprises:

determining a current configuration of a configurable surface of the second golf area; and identifying, using the current configuration of the configurable surface, the one or more lights that are not occluded from the location on the second golf area.

5. The system of claim 1, wherein identifying the one or more lights that are not occluded from the location on the second golf area comprises:

predicting a location of one or more players indicating where the one or more players may stand on the second golf area; and identifying, using (i) the predicted location of one or more of the players and (ii) a location of a golf hole on the second golf area, the one or more lights that are not occluded from the location on the second golf area.

6. The system of claim 5, wherein predicting the location of one or more players indicating where the one or more players may stand on the second golf area comprises:

obtaining details indicating handedness of the one or more players; and predicting the location of the one or more players using the obtained details.

7. The system of claim 1, wherein identifying the one or more lights that are not occluded from the location on the second golf area comprises:

determining a current configuration of a configurable surface of the second golf area;

querying a database using the current configuration of the configurable surface; and identifying, based on data obtained from querying the database, the one or more lights that are not occluded from the location on the second golf area.

8. The system of claim 1, wherein identifying the one or more lights that are not occluded from the location on the second golf area comprises:

activating a first light source; and obtaining reflected data of the first light source.

9. The system of claim 8, wherein the operations comprise:

determining, using the reflected data, that the first light source is not occluded from the location on the second golf area; and identifying the first light source as one of the one or more lights that are not occluded from the location on the second golf area.

10. The system of claim 8, wherein the operations comprise:

determining, using the reflected data, that the first light source is occluded from the location on the second golf area; and identifying another light as one of the one or more lights that are not occluded from the location on the second golf area.

11. The system of claim 1, wherein activating the one or more lights to direct light at the location on the second golf area comprises:

generating a command configured to (i) move one or more of the one or more lights and (ii) subsequent to moving one or more of the one or more lights, activate the one or more lights to direct light at the location on the second golf area.

12. The system of claim 1, wherein the operations comprise:

identifying at least one occluded light of the plurality of lights that is occluded from the location on the second golf area; and generating a command in response to identifying the at least one occluded light, the command being configured to move the at least one occluded light to a position that is not occluded from the location on the second golf area, wherein the identifying the one or more lights of the plurality of lights that are not occluded from the location on the second golf area comprises identifying the at least one occluded light as no longer being occluded after movement to the position.

13. The system of claim 1, wherein the operations comprise:

determining a second location for a second golf ball on the second golf area;

identifying at least one of the one or more lights are not occluded from the second location on the second golf area;

identifying one or more different lights that are not occluded from the location on the second golf area; and activating (i) the at least one of the one or more lights to direct light at the second location on the second golf area and (ii) the one or more different lights to direct light at the location on the second golf area.

14. The system of claim 13, wherein the operations comprise:

determining the one or more lights are the only lights that are not occluded from the second location on the second golf area from among a set of two or more lights.

15. The system of claim 1, wherein the operations comprise:

determining a second location for a second golf ball on the second golf area;

identifying a second set of one or more lights that are not occluded from the second location on the second golf area; and activating the second set of one or more lights to direct light at the second location on the second golf area.

16. The system of claim 15, wherein the second set of one or more lights are different from the one or more lights.

17. The system of claim 1, wherein the at least one sensor is associated with a golf simulator, and wherein determining the location for the golf ball on the second golf area comprises:

obtaining data indicating a simulated position of a golf ball struck using the golf simulator associated with the first golf area; and determining the location for the golf ball on the second golf area as the simulated position of the golf ball.

18. The system of claim 1, wherein the one or more lights are mounted on a wall surrounding the second golf area.

19. The system of claim 1, wherein the one or more lights are mounted on a wall surrounding the second golf area at a height of less than 50 feet.

20. The system of claim 1, wherein the one or more lights are mounted above the second golf area.

21. The system of claim 1, wherein the one or more lights include a device that performs light amplification by stimulated emission of radiation.

22. The system of claim 1, wherein the second golf area comprises a chipping area.

* * * * *